(12) United States Patent
Henry et al.

(10) Patent No.: US 11,811,762 B2
(45) Date of Patent: Nov. 7, 2023

(54) SPONSOR DELEGATION FOR MULTI-FACTOR AUTHENTICATION

(71) Applicant: Cisco Technology, Inc., San Jose, CA (US)

(72) Inventors: Jerome Henry, Pittsboro, NC (US); Vinay Saini, Bangalore (IN); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 17/168,276

(22) Filed: Feb. 5, 2021

(65) Prior Publication Data

US 2022/0255934 A1    Aug. 11, 2022

(51) Int. Cl.
*H04L 9/40* (2022.01)
*H04L 9/08* (2006.01)

(52) U.S. Cl.
CPC ........ *H04L 63/0884* (2013.01); *H04L 9/0866* (2013.01); *H04L 9/0894* (2013.01); *H04L 63/0861* (2013.01); *H04L 63/102* (2013.01); *H04L 63/20* (2013.01); *H04L 2463/082* (2013.01)

(58) Field of Classification Search
CPC . H04L 63/0884; H04L 9/0866; H04L 9/0894; H04L 63/0861; H04L 63/102; H04L 63/20; H04L 2463/082; H04L 63/105; H04L 63/205; H04L 63/0853
See application file for complete search history.

(56) References Cited

U.S. PATENT DOCUMENTS

| | | |
|---|---|---|
| 2015/0046990 A1 | 2/2015 | Oberheide et al. |
| 2015/0242616 A1 | 8/2015 | Oprea et al. |
| 2016/0087952 A1 | 3/2016 | Tartz et al. |
| 2018/0198614 A1 | 7/2018 | Neumann |
| 2019/0364034 A1 | 11/2019 | Alexander |
| 2020/0128013 A1* | 4/2020 | Mossoba ............ H04L 63/0838 |

FOREIGN PATENT DOCUMENTS

| | | | | |
|---|---|---|---|---|
| CN | 108737436 B | * | 2/2020 | ............ H04L 63/08 |
| EP | 3641269 A1 | | 4/2020 | |
| WO | WO-2009051471 A2 | * | 4/2009 | ............ G06F 21/53 |
| WO | 2012021839 A2 | | 2/2012 | |
| WO | 2019104323 A1 | | 5/2019 | |

OTHER PUBLICATIONS

Hoffman, Chris, "How To Set Up Authy For Two-Factor Authentication (And Sync Your Codes Between Devices)," How to Geek, 2017, pp. 1-21.
International Search Report and Written Opinion for PCT Application No. PCT/US2022/013752 dated Apr. 8, 2022, 13 pages.

* cited by examiner

*Primary Examiner* — Michael R Vaughan
(74) *Attorney, Agent, or Firm* — Polsinelli

(57) ABSTRACT

Disclosed are methods, systems, and non-transitory computer-readable media for using a sponsor as a proxy for multi-factor authentication of a first user account for a first user when a primary multi-factor authentication mechanism is unavailable to the first user account, comprising registering the sponsor in a multi-factor authentication chain of trust associated with the first user account; requesting verification of an identity of the first user from the sponsor; receiving, from the sponsor, a verification of the identity of the first user; and granting access to a service to the first user account.

20 Claims, 10 Drawing Sheets

425

```
┌─────────────────────────────────────────────────────────────────────────┐
│ Sending a request for authentication via a sponsor in a multi-factor    │
│ authentication chain of trust associated with a first user account      │
│                                 430                                      │
└─────────────────────────────────────────────────────────────────────────┘
                                    │
                                    ▼
┌─────────────────────────────────────────────────────────────────────────┐
│ Receiving, from the sponsor, a request for verification of an identity  │
│ of a first user associated with the first user account                  │
│                                 435                                      │
└─────────────────────────────────────────────────────────────────────────┘
                                    │
                                    ▼
┌─────────────────────────────────────────────────────────────────────────┐
│              Sending a verification of the identity of the first user    │
│                                 440                                      │
└─────────────────────────────────────────────────────────────────────────┘
                                    │
                                    ▼
┌─────────────────────────────────────────────────────────────────────────┐
│                Receiving access to a service for the first user          │
│                                 445                                      │
└─────────────────────────────────────────────────────────────────────────┘
```

FIG. 4B

SPONSOR DELEGATION FOR MULTI-FACTOR AUTHENTICATION

TECHNICAL FIELD

The present technology pertains to a system that authenticates a user via a third-party sponsor, and more specifically, the present technology pertains to implementing polices for when a third-party sponsor can be part of an authentication process and to policies for access when a sponsor is utilized.

BACKGROUND

Users and devices are now commonly authenticated with multi-factor authentication, using multiple devices to access a resource to have more certainty over the identity of the user. However, existing multi-factor authentication methods come with various drawbacks. One such drawback involves the case where a device used in multi-factor authentication is misplaced, unusable, or stolen.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 4A, 4B, and 4C illustrate flowcharts of methods for using a sponsor in a CMFA system in accordance with some aspects of the present technology.

DETAILED DESCRIPTION

Figure 1:
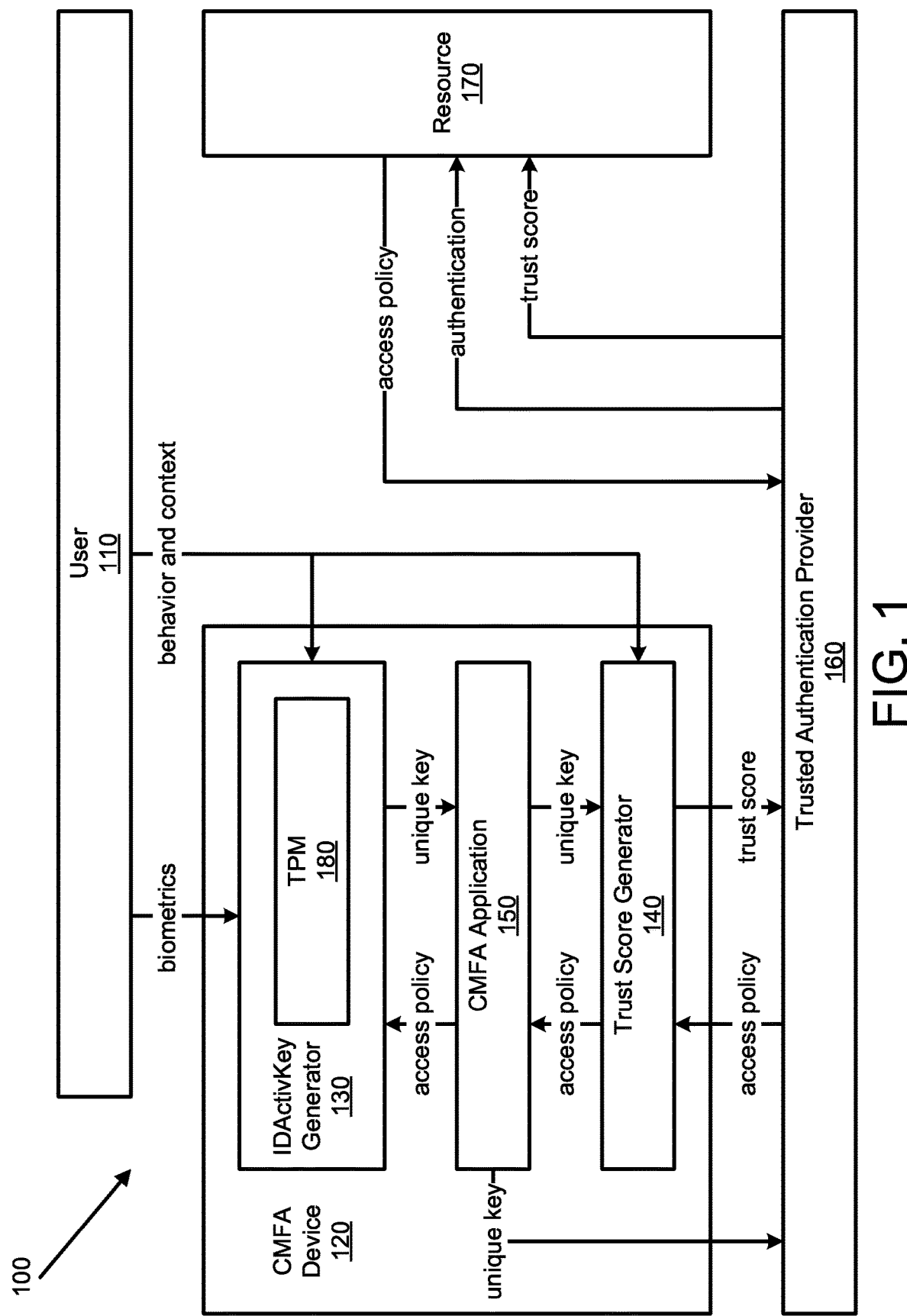
FIG. 1 illustrates an example continuous multi-factor authentication (CMFA) system in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Methods, systems, and non-transitory computer-readable media are provided for using a sponsor as a proxy for multi-factor authentication of a first user account for a first user when a primary multi-factor authentication mechanism is unavailable to the first user account.

A method can include registering the sponsor in a multi-factor authentication chain of trust associated with the first user account; requesting verification of an identity of the first user from the sponsor; receiving, from the sponsor, a verification of the identity of the first user; and granting access to a service to the first user account.

In some embodiments of the method, registering the sponsor in the multi-factor authentication chain of trust includes associating the sponsor with a sponsor policy that defines when use of the sponsor is permitted.

In some embodiments of the method, the granted access is limited by an access policy that defines limited access when access is granted based on the verification of the sponsor.

In some embodiments of the method, the request for verification of the identity from the sponsor includes a declaration that the primary multi-factor authentication mechanism must be replaced.

In some embodiments of the method, granting access to the service includes sending a link to onboard a new multi-factor authentication mechanism and removing the primary multi-factor authentication mechanism from the multi-factor authentication chain of trust.

In some embodiments of the method, requesting verification of the identity of the first user from the sponsor includes initiating a communication between the first user account and the sponsor.

In some embodiments of the method, the primary multi-factor authentication mechanism is responsible for generating keys derived from biometric data, and the method includes replacing the primary multi-factor authentication mechanism, including instructing a replacement primary multi-factor authentication mechanism to generate a new biometrically derived key; receiving the new biometrically derived key; and storing the new biometrically derived key in association with the service to be used in future authentications.

In some embodiments of the method, the method includes receiving a request to access a service accompanied by log-in credentials for the first user account.

In some embodiments of the method, the method includes determining that a multi-factor authentication request failed and notifying the first user account that the multi-factor authentication request failed.

In some embodiments of the method, the method includes determining that a trust score associated with the primary multi-factor authentication mechanism is too low to perform the multi-factor authentication.

In some embodiments of the method, the method includes receiving a request to have the sponsor satisfy the multi-factor authentication for the user account.

A system can include one or more processors and at least one non-transitory computer-readable medium having stored therein instructions which, when executed by the one or more processors, cause the one or more processors to perform operations including registering the sponsor in a multi-factor authentication chain of trust associated with the first user account; requesting verification of an identity of the first user from the sponsor; receiving, from the sponsor, a verification of the identity of the first user; and granting access to a service to the first user account.

A non-transitory computer-readable medium can have stored therein instructions which, when executed by a processor, cause the processor to perform operations including registering the sponsor in a multi-factor authentication chain of trust associated with the first user account; requesting verification of an identity of the first user from the sponsor; receiving, from the sponsor, a verification of the identity of the first user; and granting access to a service to the first user account.

Description of Example Embodiments

The present technology pertains to methods, systems, and non-transitory computer-readable media for using a sponsor as part of a multi-factor authentication chain of trust.

Continuous multi-factor authentication (CMFA) systems, and multi-factor authentication (MFA) systems more generally, are used to increase the certainty that users are who they say they are. These systems rely on the idea that a trusted personal computing device is able to affirm a user's identity when the user is accessing a resource through an access device. However, there are situations when a user does not have a trusted personal computing device available, due to the theft, misplacement, malfunction, or other means. In these cases, MFA systems stall.

One way to address this is to delegate a backup device which is operated by a third-party sponsor. For example, suppose that a student needed to use multi-factor authentication to access an online education resource. The trusted personal computing device in this situation could be the student's smartphone. However, if the smartphone is unavailable, the system could be configured to use a smartphone or laptop owned by one of the student's parents or guardians. Thus, use of the backup device would allow the student to access the educational resource even when the student's own device was inaccessible or unusable.

An advantage of the present technology is the ability to access resources even when MFA or CMFA devices are not available. Access will not be contingent on the presence of a given device; the present technology addresses the more general problem of assuring that the right users are accessing appropriate resources. In some cases, such as accessing secure medical records in an emergency room setting, the ability to circumvent the need for a specific device could be life-saving.

Another advantage of the present technology involves the use of sponsor policies. Policies can designate who can become a sponsor, in what circumstances sponsors can be used, and what access sponsors can give. Consider a corporation which allows managers to be sponsors for employees; when employees request access via a manager sponsor, employees can access sensitive internal documents for a set period of time. These policies can be set by organizations, resource providers, network providers, user devices, sponsor devices, trusted authentication providers, or others parties. Sponsor policies provide organizations granular means to regulate members' access in given situations. Specialized access can be granted by certain sponsors, improving organizational oversight and efficiency of resource access.

This disclosure will first discuss an example continuous multi-factor authentication (CMFA) system. Then, the disclosure will discuss example embodiments related to the use of a sponsor in a multi-factor authentication chain of trust. Finally, the disclosure will discuss an example computing system which can be used to execute the present technology.

FIG. 1 illustrates an example continuous multi-factor authentication (CMFA) system 100 in accordance with some aspects of the present technology. User 110 can gain authorized access to resource 170 by using CMFA device 120.

Resource 170 can be any service, resource, device, or entity to which requires authentication of user 110. For example, resource 170 can be a social media service, bank, hospital, motor vehicle department, bar, voting system, IOT device, or access device. In some embodiments, resource 170 can be accessed by user 110 through an access device, such as a mobile phone or personal computer. In some embodiments, resource 170 can be accessed by user 110 through an application that is specifically designed for accessing resource 170, or through a more general application which can access multiple services, such as a web browser, or portions of an operating system. In some embodiments, resource 170 can be the same device as CMFA device 120. In some embodiments, resource 170 can be a plurality or resources, such as an access device and a service which receive separate authentications from trusted authentication provider 160.

Resource 170 can authenticate the identity of user 110 through trusted authentication provider 160, which can be in communication with CMFA device 120. Data gathered by CMFA device 120 can be used for authentication of user 110 to resource 170 via trusted authentication provider 160. Trusted authentication provider 160 can receive an identification credential, such as an IDActivKey, from CMFA device 120 via CMFA application 150 that is unique to resource 170 for user 110. Trusted authentication provider 160 can also receive a trust score from CMFA device 120 via trust score generator 140. Upon receiving an IDActivKey and a trust score, trusted authentication provider 160 can use this information in tandem with access requirements received from resource 170 to authenticate user 110 to resource 170.

To generate identification credentials, CMFA Device 120 can be associated with user 110, and can gather biometric, behavioral, and contextual data from user 110. The biometric, behavioral, or contextual data, or some combination, can be used by IDActivKey generator 130 to generate a unique IDActivKey corresponding to resource 170. These biometrics can include, for example, fingerprints, facial detection, retinal scans, voice identification, or gait data, among other biometrics. For each resource 170, a cryptographic seed from a pseudo-arbitrary number generator in trusted platform module (TPM) 180 can be used to select a sampling of the biometric data to be used in an IDActivKey for the application in question. In some embodiments, the IDActivKey may only be derived when CMFA device 120 determines that certain behavioral and contextual requirements indicate compliance with a policy. In some embodiments, there can be a "master" IDActivKey that is used to gain access to trusted authentication provider 160.

In some embodiments, behavioral and contextual data can be used to ensure that the context of user 110 is acceptable as specified by a policy of resource 170. Behavioral and contextual data can be used by trust score generator 140, which can generate a trust score as a measure of confidence in the authentication of user 110, and as a measure of confidence that the authenticated user 110 is still present and behaving in an acceptable manner as specified by a policy of resource 170.

In some embodiments, trusted computing implementations, such as TPM 180, can rely on roots of trust. Roots of trust can provide assurances that the root has been implemented in a way that renders it trustworthy. A certificate can identify the manufacturer and evaluated assurance level (EAL) of TPM 180. Such certification can provide a level of confidence in the roots of trust used in TPM 180. Moreover, a certificate from a platform manufacturer may provide assurance that TPM 180 was properly installed on a system that is compliant with specific requirements so the root of trust provided by the platform may be trusted. Some implementations can rely on three roots of trust in a trusted platform, including roots of trust for measurement (RTM), storage (RTS), and reporting (RTR).

Trust score generator 140 can generate a trust score for user 110 using behavioral and contextual data, the surrounding environment, or other sources. For example, location information can be derived from the network that user 110 is using. These data can include information about location, movement, or device behavior. The trust score reflects a confidence level that user 110 is in compliance with a policy specified by resource 170. This includes the confidence that user 110 is the person operating the current session.

Trusted authentication provider 160 can request updated IDActivKeys and trust scores at different intervals depending on the requirements specified by the access policies defined by resource 170. It can send new access policies received from resource 170 during a session to CMFA device 120. Trusted authentication provider 160 can shield private information from resource 170, providing authentication without revealing information such as birth dates, social security numbers, or marital status, etc. In some embodiments, trusted authentication provider 160 need only inform resource 170 that access should be granted, while in some embodiments trusted authentication provider 160 can send an IDActivKey to resource 170.

User 110 can be any user including an employee, contractor, client, member of an organization, or private individual, etc. attempting to access a service. User 110 can use an access device to access resource 170 which may or may not be the same device as CMFA device 120. In some embodiments, CMFA device 120 can be used to authenticate an access device.

CMFA device 120 can be hardware, software-only, or combinations thereof. CMFA device 120 can be a mobile device or a personal computer; it may or may not be the same device as access device 110. In some embodiments, CMFA device 120 can include secure hardware such as trusted platform module (TPM) 180. In some embodiments, one or more of IDActivKey generator 130, TPM 180, and trust score generator 140 can be located in a physically separate and secure portion of CMFA device 120.

While FIG. 1 only illustrates one application 190, and one resource 170, it should be appreciated that there can be any number of applications 190 or application providers 170. Each resource 170 can have its own access policy, and any IDActivKey will be unique to each respective resource 170.

Figure 2A:
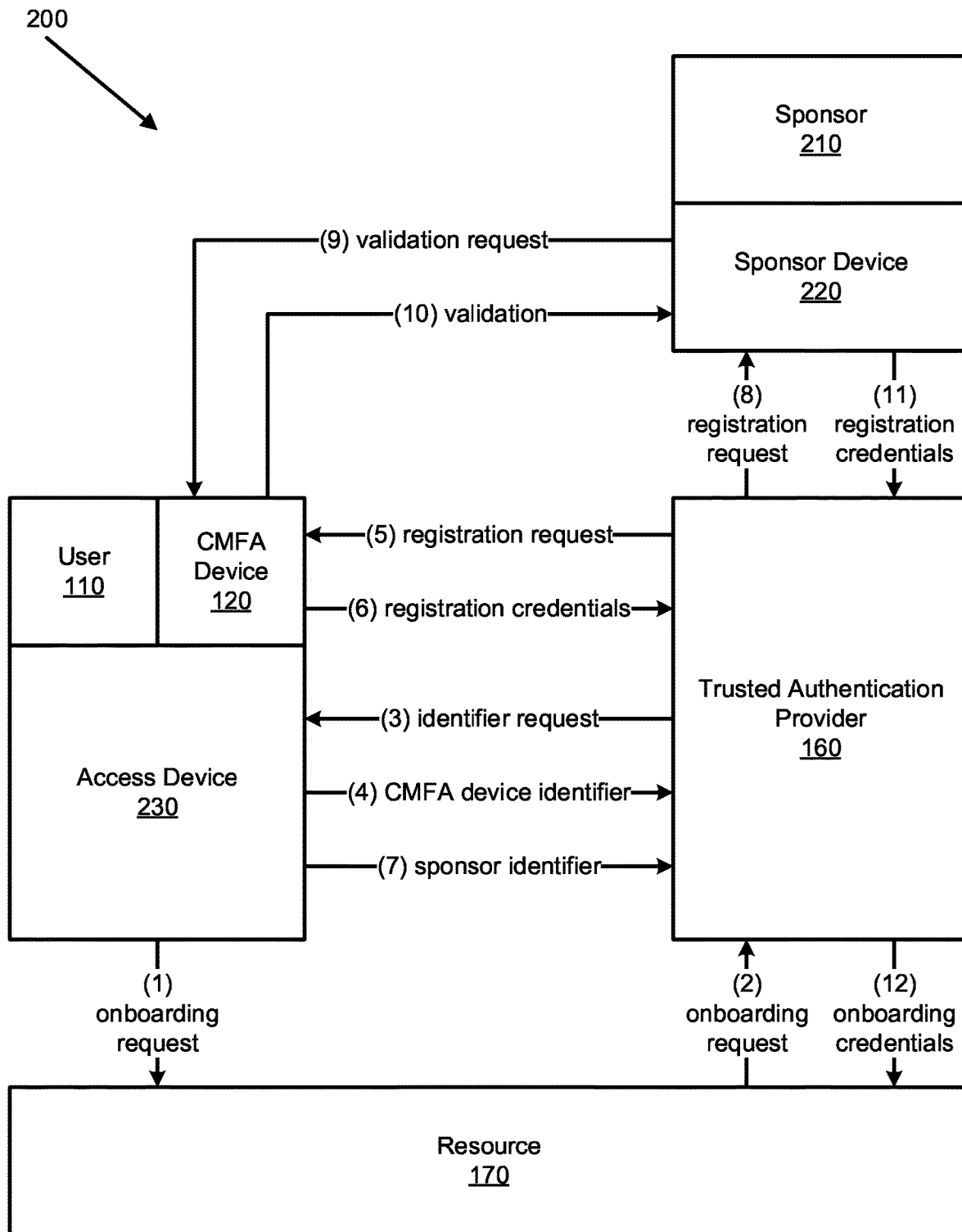
FIGS. 2A and 2B illustrate example CMFA systems for registering devices in accordance with some aspects of the present technology.
Figure 2B:
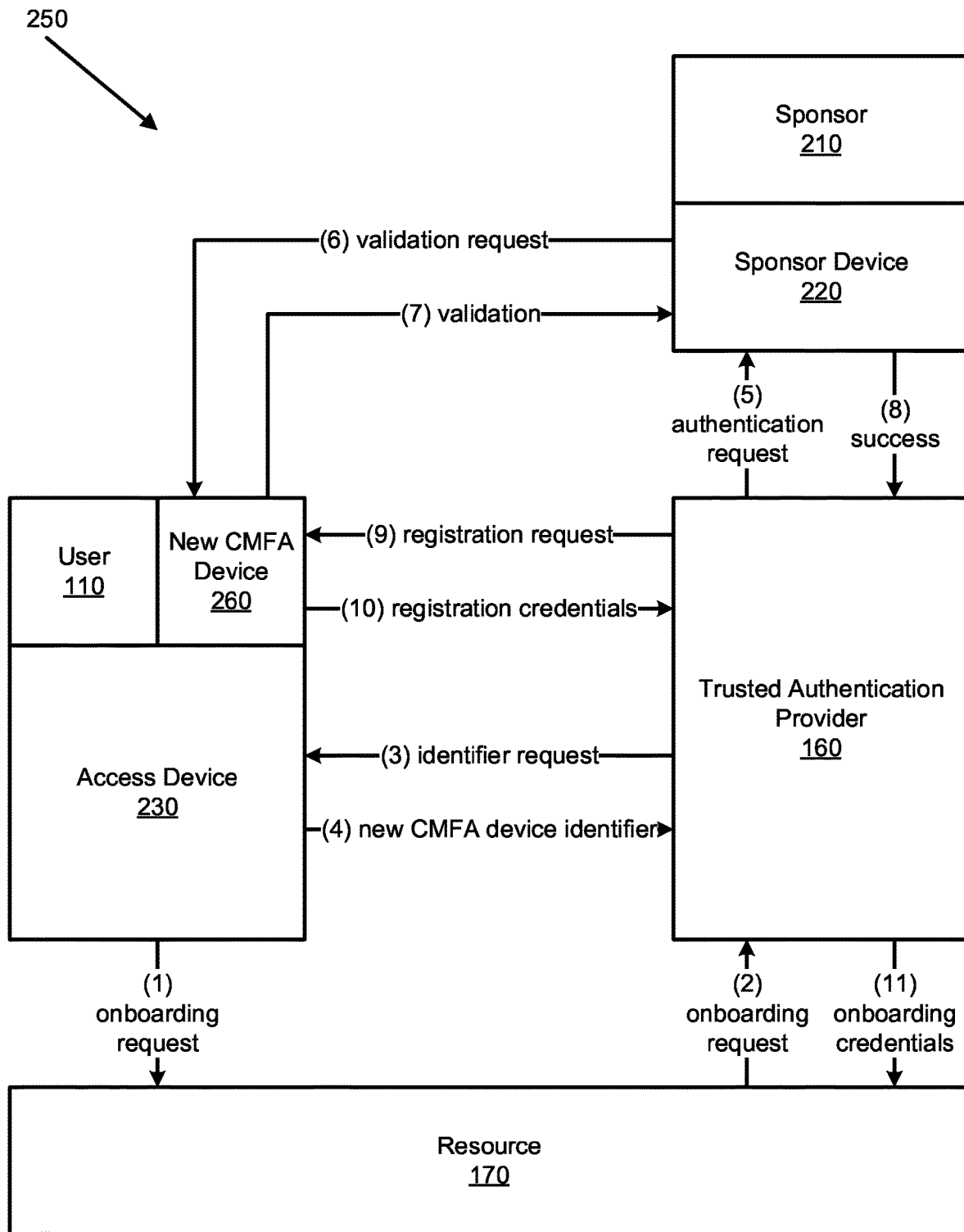

FIGS. 2A and 2B illustrate example CMFA systems for registering devices in accordance with some aspects of the present technology.

FIG. 2A illustrates a system 200 for registering a trusted personal device and a sponsor device for multi-factor authentication. While an example collection of steps is illustrated in FIG. 2A, it will be appreciated that the present technology may require a sponsor 210 or sponsor device 220 to be known to trusted authentication provider 160 prior to user 110 relying on sponsor 210 for help in authentication.

Access device 230, operated by user 110, can send an onboarding request (1) to resource 170. Access device 230 is operated by user 110 and can be any device used to access resource 170, such as a laptop, smartphone, or tablet. In response to the onboarding request, resource 170 makes an onboarding request (2) of trusted authentication provider 160. The onboarding requires establishing a multi-factor authentication chain of trust for user 110.

Upon receiving the onboarding request (2), trusted authentication provider 160 can request identifiers (3) from access device 230, where the identifiers identify components in the multi-factor authentication chain of trust. Access device 230 can supply (4) device identifiers for a trusted personal device (CMFA device 120) (4) and a sponsor (sponsor 210) (7). Identifiers can be phone numbers or other unique identifiers for CMFA device 120, or email or other unique identifiers for sponsor 210.

CMFA device 120 can receive a registration request (5) from trusted authentication provider 160. In response to the registration request (5), CMFA device 120 can return whatever registration credentials (6) are required for accessing resource 170. Registration credentials, such as the IDActivKey discussed in FIG. 1, can be derived from biometrics, behavior, and context, and can be accompanied by a trust score. In some embodiments, each resource 170 will have unique registration credentials. In some embodiments, trusted authentication provider 160 will have a uniform set of registration credentials used for any resource 170.

Sponsor device 220, operated by sponsor 210, can receive a similar registration request (8) from trusted authentication provider 160. However, because sponsor device 220 is not operated by user 110, sponsor device 220 cannot immediately verify the registration request. To close the multi-factor authentication chain of trust and ensure that user 110 sent the registration request, sponsor device 220 can send a validation request (9) to CMFA device 120 to validate the identity of user 110. In some embodiments, validation can take the form of a phone call, video call, password, PIN, or biometrics. Once validated (10), sponsor device 220 can send the registration credentials (11) to trusted authentication provider 160.

In some embodiments, registration of sponsor device 220 and sponsor 210 must adhere to a policies set by trusted authentication provider 160, resource 170, user 110, or other entity. Such policies can, for example, define when use of the sponsor device 220 in the multi-factor authentication chain of trust is permitted, or even define a circumscribed set of identities for an acceptable sponsor 210. The policies can further define what kinds of access sponsor device 220 can grant, including access to resource 170 which is limited by a duration of time, level of clearance, location of access device 230, or by other factors. The registration of sponsor device 220 can also trigger the implementation of some policies regarding the use of sponsor device 220, which can be dependent on sponsor device 220 or the identity of sponsor 210.

Sponsor 210 can be any person trusted by user 110. It can be a friend, family member, colleague, employer, or supervisor. The choice of sponsor 210 is important for ensuring the security of CMFA device 120.

Once trusted authentication provider 160 has received registration credentials from CMFA device 120 and sponsor device 220, it can send onboarding credentials (12) to resource 170. From these onboarding credentials, resource 170 can onboard user 110.

While FIG. 2A illustrates an example of onboarding a sponsor 210 as part of a multi-factor authentication chain of trust for user 110 in relation to resource 170, in some embodiments of the present technology, similar benefits can be achieved through direct interactions with trusted authentication provider 160. In such embodiments, user 110 may utilize CMFA device 120 to identify and onboard sponsor 210. Later, when access to resource 170 is required, the sponsor 210 can be utilized to confirm the identity of user 110, and trusted authentication provider 160 can authenticate user 110 to resource 170 subject to any applicable policies.

In some embodiments, CMFA device 120 and sponsor 210 can be onboarded to trusted authentication provider 160 instead of to resource 170. In this embodiment, the multi-factor authentication chain of trust exists not as tied to a particular resource 170, but more generally to user 110. This chain of trust can then be accessed by certain resources 170 in certain situations.

In some embodiments, trusted authentication provider 160 can maintain a hierarchy of multiple sponsors 210 within the multi-factor authentication chain of trust. Each sponsor 210 can be endowed with different degrees of authority to authenticate user 110 to different resources. For instance, a first sponsor 210 can authenticate user 110 to multiple resources 170, while a second sponsor 210 can only authenticate user 110 to one of the multiple resources 170. If a first sponsor 210 is unavailable, trusted authentication provider 160 can use a second sponsor 210 to authenticate user 110, and so on through the hierarchy in the multi-factor authentication chain of trust. In some embodiments, sponsors 210 higher in the multi-factor authentication chain of trust hierarchy can manage the permissions that lower sponsors 210 can give to user 110.

FIG. 2B illustrates a system 250 for registering a new trusted personal device in a multi-factor chain of trust by using a sponsor device.

There will be times when user 110 no longer has access to CMFA device 120. This can be due to theft, sale, or malfunction. When user 110 replaces CMFA device 120 with new CMFA device 260, new CMFA device 260 will need to be onboarded as CMFA device 120 and sponsor device 220 were in FIG. 2A. A secure system will need to ensure that new CMFA device 260 is not onboarded in the name of user 110 when it is actually operated by an adversary.

The process for registering new CMFA device 260 in the multi-factor chain of trust proceeds, at first, in a similar manner to that descried in FIG. 2A (1-4), where new CMFA device 230 is identified for onboarding by access device 230. To confirm that user 110 is new CMFA device 260 and made the initial onboarding request (1), trusted authentication provider 160 can request authentication (5) of the identity of user 110 through sponsor device 220. Sponsor device 220 can send a validation request (6) to new CMFA device 260 and receive validation (7) in return, similar to the analogous steps described in FIG. 2A. Once user 110 is authenticated (8), trusted authentication provider 160 can send a registration request (9) to new CMFA device 260, which can return registration credentials (10). These can be forwarded, along with any other necessary credentials, to resource 170 for onboarding (11).

In some examples, certain credentials related to user 110, such as biometrics, may only be stored on a CMFA device in a corresponding trusted platform module. Validation of the identity of user 110 via new CMFA device 260 can consist of a phone call, video call, or other means that do not involve the transfer of the secure credentials. Trusted authentication provider 160 can remove CMFA device 120 from the multi-factor authentication chain of trust and replace it with new CMFA device 260 as the primary device.

In some examples, credentials related to user 110 can be stored on a server, such as trusted authentication provider 160. For instance, credentials like IDActivKey can comprise biometrics, behavior, and context in a certain pattern which functions as both a personal identifier and password to access resource 170. For resources 170 that need a consistent IDActivKey to operate, credentials may need to be stored on trusted authentication provider 160 to ensure that a lost device, such as CMFA device 120, does not also imply the loss of access to resource 170.

When registration credentials for resource 170 are stored in trusted authentication provider 160, registration of new CFMA device 260 can include sharing these trusted credentials, sharing a sampling pattern as in the IDActivKey, or other means to give new CMFA device 260 what it needs to generate registration credentials. These credentials can be shared as part of the registration request (9).

In other cases, new CMFA device 260 can generate registration credentials independent of those previously used by CMFA device 120. Trusted authentication provider can request a new IDActivKey (9) from new CMFA device 260 or other trusted credentials from new CMFA device 260 to replace the existing credentials which were originally generated by CMFA device 120. Once received (10), the new biometrically derived key, such as an IDActivKey, or other credential can be stored by trusted authentication provider 160 or resource 170 to be used in future authentications of user 110, either via new CMFA device 260 or sponsor device 220. In some embodiments, the use of sponsor device 220 to register new CMFA deice 260 requires an admission that CMFA device 120 must be replaced in the multi-factor authentication chain of trust.

Figure 3A:
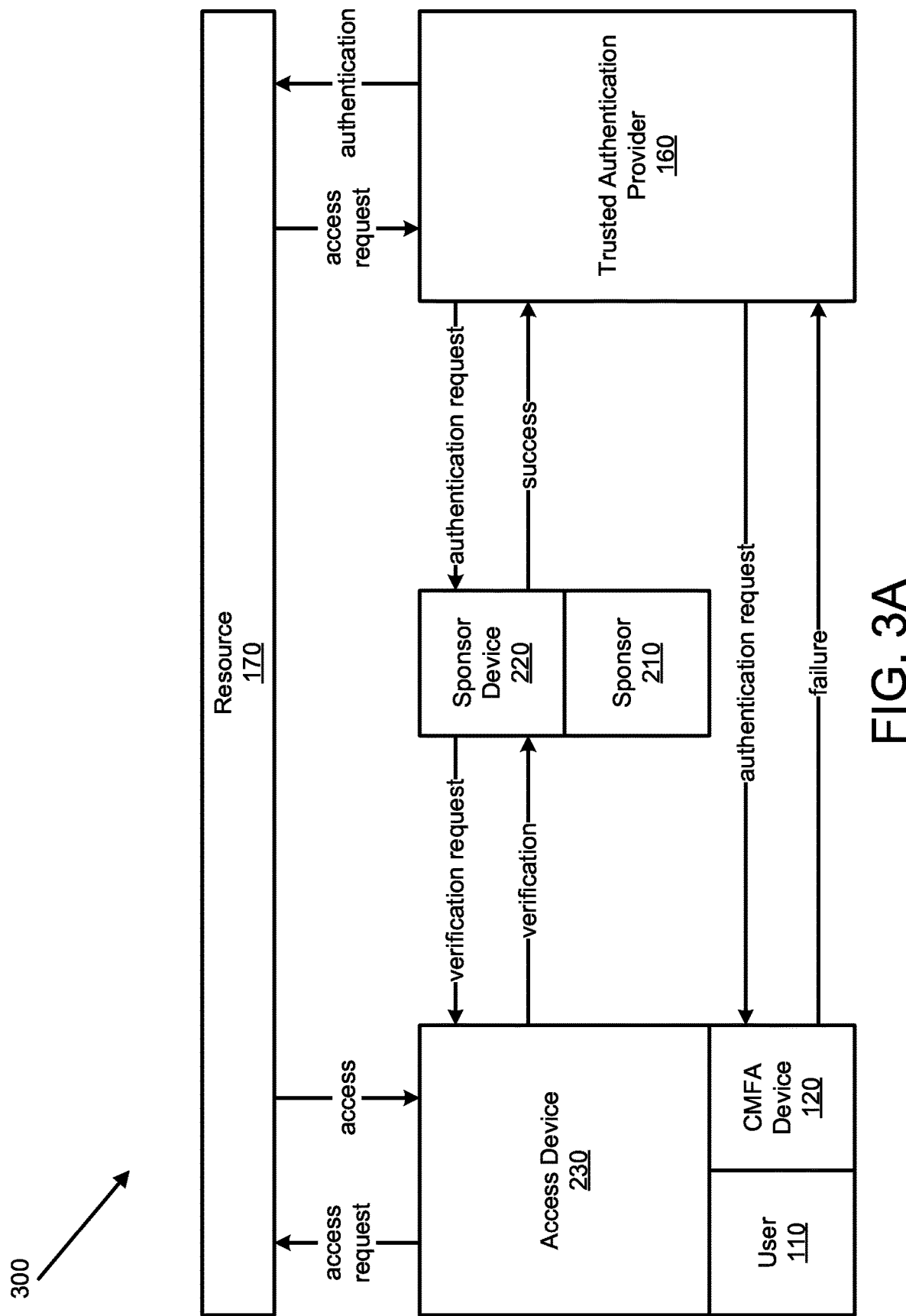
FIGS. 3A, 3B, and 3C illustrate example CMFA systems for authenticating a user in accordance with some aspects of the present technology.
Figure 3B:
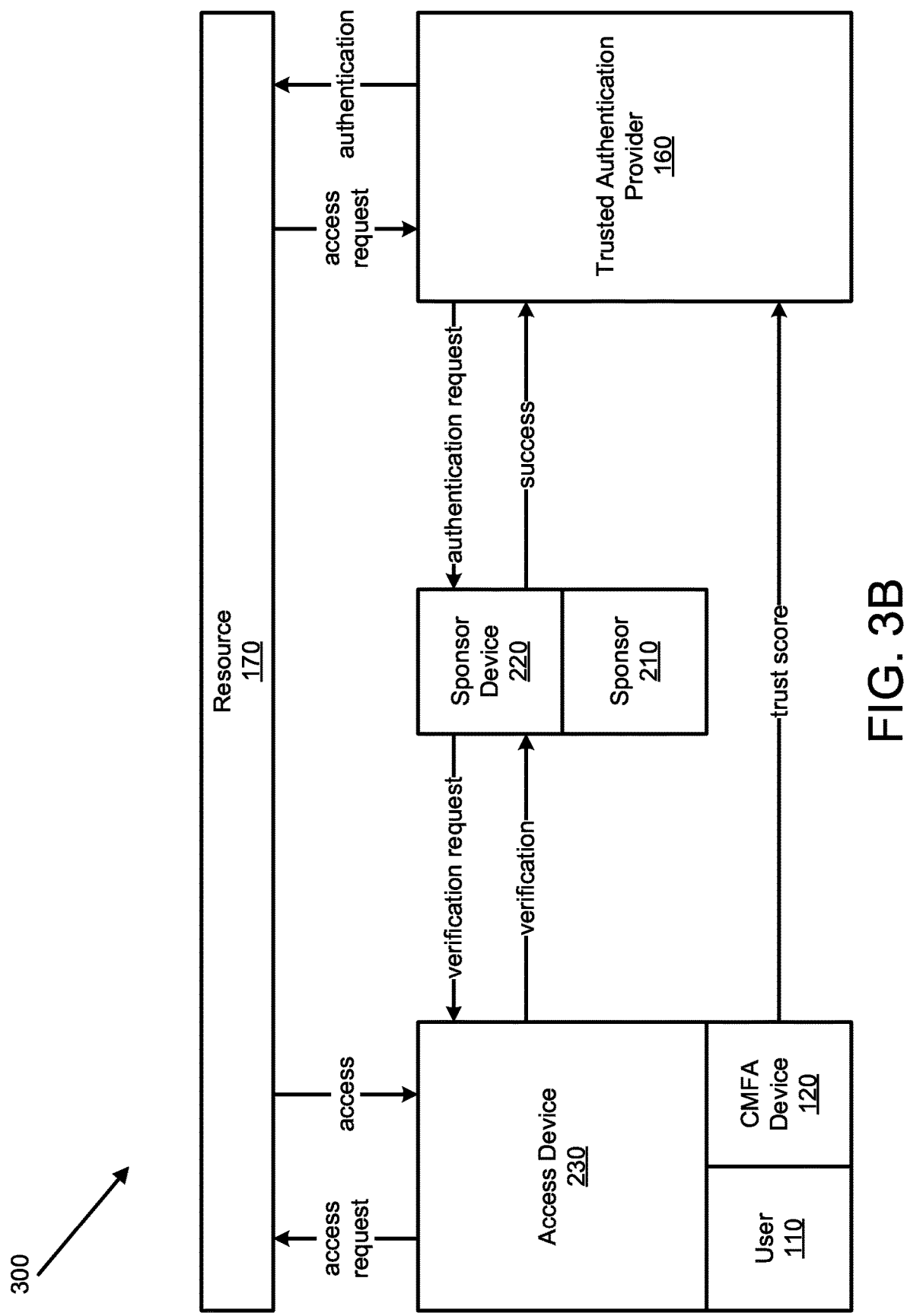
Figure 3C:
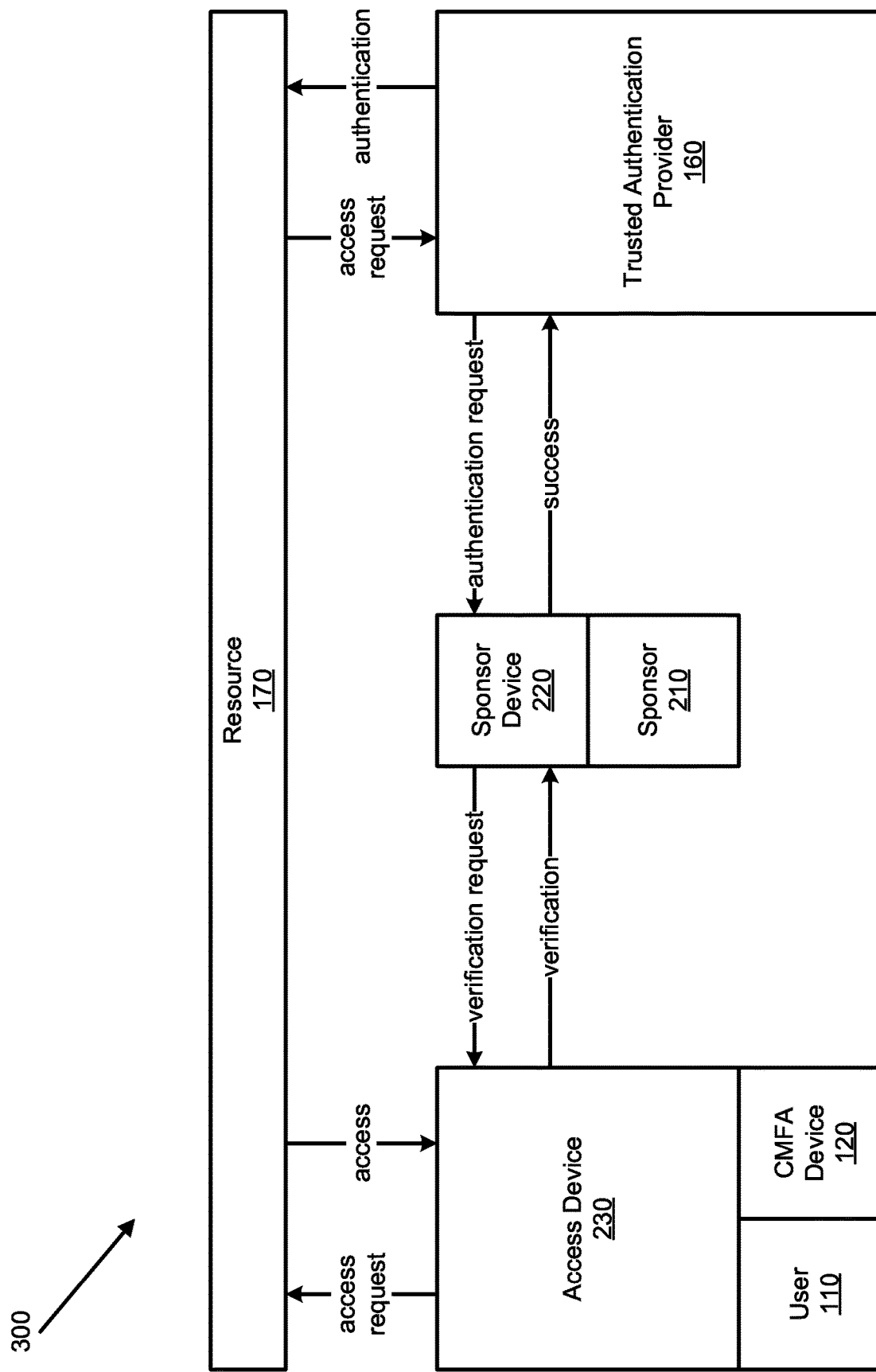

FIGS. 3A, 3B, and 3C illustrate example CMFA systems for authenticating a user in accordance with some aspects of the present technology. FIG. 3A illustrates a system 300 for authenticating a user by a sponsor device when authentication by a CMFA device has failed.

When access device 230 sends an access request to resource 170, resource 170 can forward that access request to trusted authentication provider 160 in order to receive authentication of the identity of user 110. In the multi-factor chain of trust for user 110, CMFA device 120 is the primary multi-factor authentication device. Trusted authentication provider 160 can send an authentication request to CMFA device 120. For various reasons, CMFA device 120 can fail to authenticate user 110. This can be because CMFA device 120 has been stolen, is turned off, is broken, is away from user 110, or for other reasons.

After CMFA device 120 fails to authenticate the identity of user 110, trusted can move to the next device in the multi-factor authentication chain of trust, sponsor device 220, in accordance with a sponsor policy. The succession of devices in the multi-factor authentication chain of trust can be set by CMFA device 120, trusted authentication provider 160, resource 170, or another entity. To be sure that user 110 sent the access request, sponsor device 220 can send a verification request to access device 230 to verify the identity of user 110. Verification can be done via phone or video call, text message, or other means. Once verified, sponsor device 220 can respond to the original authentication request sent by trusted authentication provider 160.

In some embodiments, granted access is limited by an access policy related to the use of sponsor device 220 in the multi-factor authentication chain of trust. Such policies can be set by trusted authentication provider 160 or by resource 170, for example. For example, policies can limit the type of access CMFA device 120 is granted to resource 170, such as access to limited applications, or can limit access for a set period of time.

Having received authentication of the identity of user 110, trusted authentication provider 160 can send an authentication to resource 170. Resource 170 can, based on the authentication, allow access to access device 230. Access can be mediated by the behavior, context, trust score, or other factors related to user 110. In some embodiments, authentication is a continuous process.

In some examples, sponsor device 220 can only authenticate user 110 for a limited amount of time. In some examples, a policy set by resource 170 can result in restricted access to resource 170 when g sponsor device 220 is used for authentication, whereas use of CMFA device 120 would result in full access.

FIG. 3B illustrates a system 300 for authenticating a user by a sponsor device when the trust score for a CMFA device is too low. In this example, CMFA device 120 has already authenticated user 110 but subsequently sent an updated trust score, as described in FIG. 1, to trusted authentication provider 160 which is below the threshold for accessing resource 170. Because the threshold is too low, trusted authentication provider 160 can move down the multi-factor authentication chain of trust, in accordance with a sponsor policy, and authenticate user 110 using sponsor device 220. Once authenticated via sponsor device 220, trusted authentication provider 160 can authenticate user 110 to resource 170, which can grant access to user 110 via access device 230.

FIG. 3C illustrates a system 300 for authenticating a user by a sponsor device when authentication by a CMFA device will not yield access to a resource. In this case, resource 170 can only be accessed with the permission of sponsor 210. For example, resource 170 can be a protected server, user 110 can be a company employee, and sponsor 210 can be a supervisor of user 110. Because of the restricted access requirements, CMFA device 120 cannot authenticate user 110 to access resource 170, so sponsor device 220 must be used. A sponsor policy could dictate levels of access that supervisors can grant to their supervisees on a case-by-case basis, or it could be a general policy applying to all supervisors at a certain level of seniority in the company. Once authenticated via sponsor device 220, trusted authentication provider 160 can authenticate user 110 to resource 170, which can grant access to user 110 via access device 230.

Figure 4A:
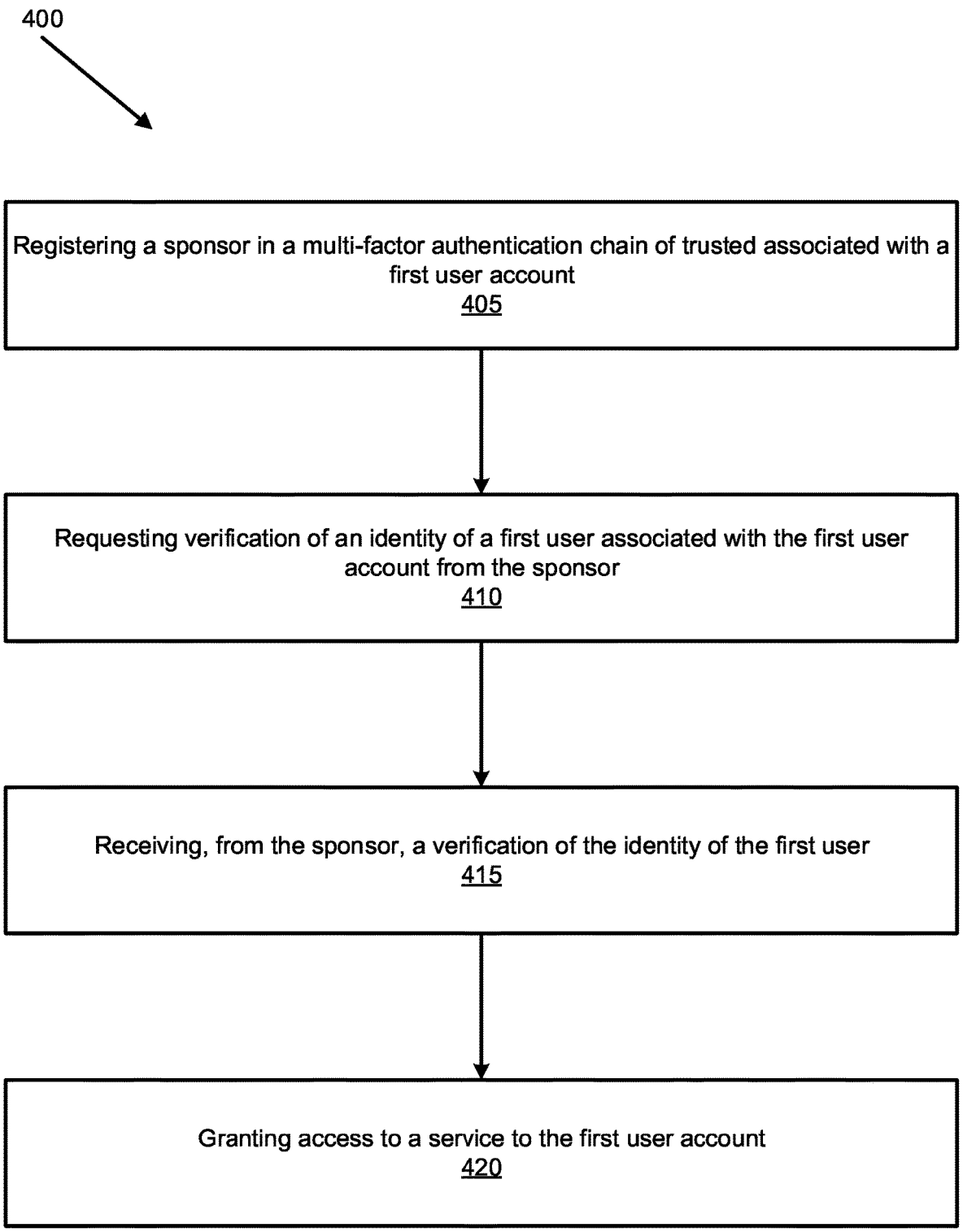
Figure 4C:
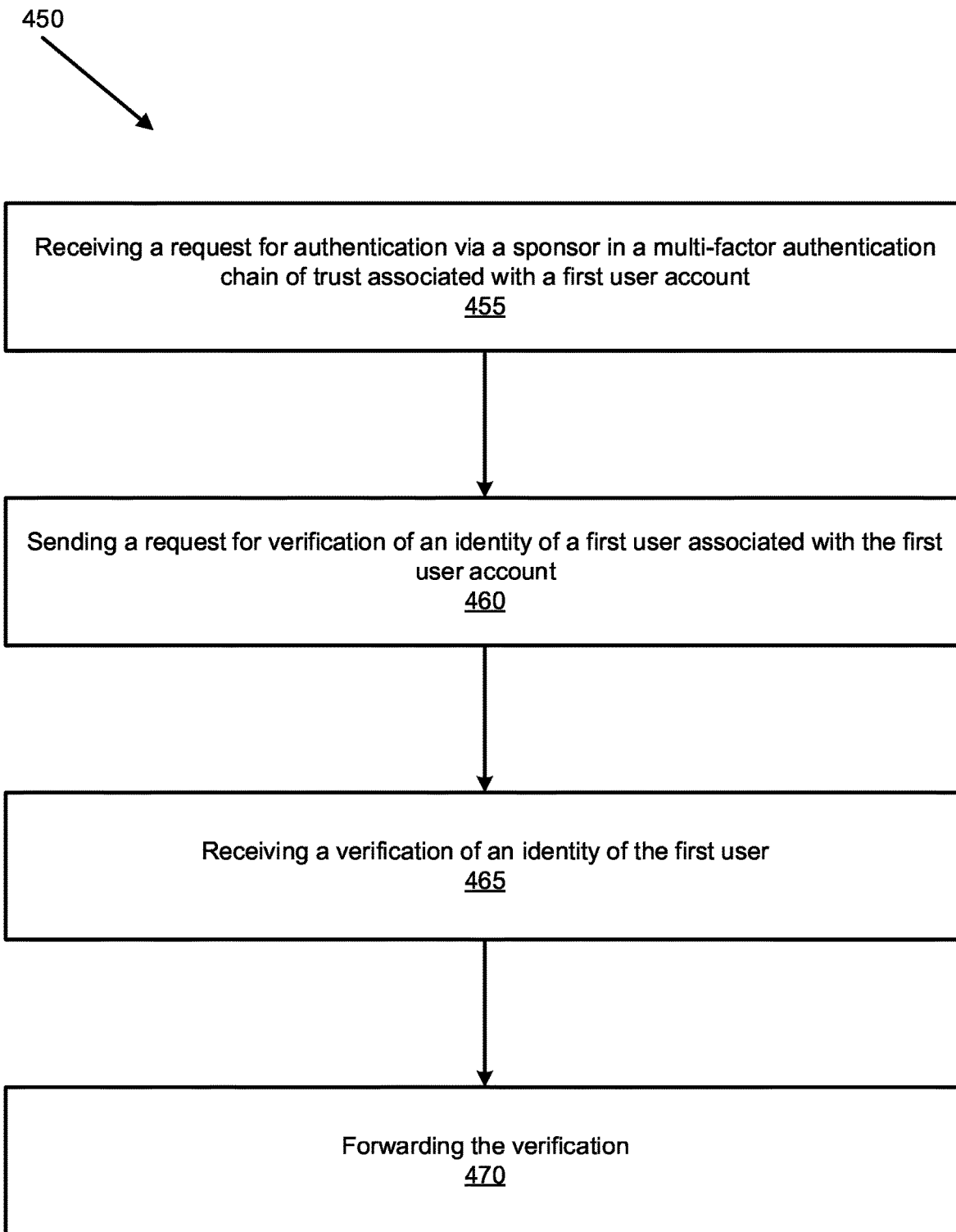

FIGS. 4A, 4B, and 4C illustrate flowcharts of methods for using a sponsor in a CMFA system in accordance with some aspects of the present technology.

FIG. 4A illustrates an example method 400 for using a sponsor in a multi-factor authentication chain of trust from the perspective of a trusted authentication provider. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

In some embodiments, the method includes registering the sponsor in a multi-factor authentication chain of trust associated with a first user account at step 405. For example, trusted authentication provider 160 illustrated in FIG. 2A may register sponsor device 220 in a multi-factor authentication chain of trust associated with an account of user 100.

In some embodiments, a sponsor policy might control when and how a sponsor might be used to access a resource. In an example, a sponsor policy defines that the use of sponsor device 220 is permitted when a trust factor associated with CMFA device 120 is below a threshold, which might indicate that the device is stolen, lost, or compromised. In another example, a sponsor policy defines that the use of sponsor device 220 is permitted when the user account has indicated that CMFA device 120 is not currently available and requests to utilize sponsor device 220. In another example, a sponsor policy defines a limited number of times that sponsor device 220 can be utilized, or a limited number of times during a period that sponsor device 220 can be utilized. In another example, a sponsor policy defines locations in which utilizations of sponsor device 220 is allowed or not allowed. In another example, registering sponsor device 220 in the multi-factor chain of trust includes associating sponsor device 220 with a sponsor policy that defines when use of the sponsor is permitted.

In some embodiments, the method includes requesting verification of the identity of user 100 from sponsor device 220 at step 410. For example, trusted authentication provider 160 illustrated in FIG. 3A may request verification of the identity of user 100 from sponsor device 220. In an example, the request for verification of the identity from the sponsor includes a declaration that CMFA device 120, the primary multi-factor authentication device, must be replaced, i.e. the device is lost or broken.

In another example of step 410, the method comprises initiating a communication between an account of user 110 and sponsor device 220. For example, the access device 230 illustrated in FIG. 3A may initiate a communication between an account of user 100 and sponsor device 220. In a first example, the communication between an account of user 100 and sponsor device 220 is a voice call. In a second example, the communication between an account of user 100 and sponsor device 220 is a video call. In a third example, the communication between an account of user 100 and sponsor device 220 requires context information to be provided by user 100, the context information including a location of the user 100, a reason why the verification of by sponsor device 220 is needed, and to which resource 170 access is requested.

In some embodiments, the method includes receiving, from sponsor device 220, a verification of the identity of user 100 at step 415. For example, trusted authentication provider 160 illustrated in FIG. 3A may receive, from sponsor device 220, a verification of the identity of user 100.

In some embodiments, the method includes granting access to a service to the first user account at step 420. For example, resource 170 illustrated in FIG. 3A may grant access to a service to an account of user 100.

In some embodiments, an access policy can limit access to the resource when a sponsor is used to gain access to the resource. In an example, the access policy limits access to systems other than highly confidential or highly sensitive systems. In another example, the access policy limits access to view only access and prevents downloading or uploading of data. In another example, the access policy limits access to a duration of time. In another example, the access policy limits access to trusted locations. In another example, the granted access is limited by an access policy that defines limited access when access is granted based on the verification of the sponsor.

In an example of step 420, the method comprises removing the primary multi-factor authentication mechanism from the multi-factor authentication chain of trust. For example, trusted authentication provider 160 illustrated in FIG. 3C may remove the primary multi-factor authentication mechanism from the multi-factor authentication chain of trust.

In another example of step 420, the method comprises sending a link to onboard a new multi-factor authentication mechanism. For example, trusted authentication provider 160 illustrated in FIG. 2B may send a link to onboard a new multi-factor authentication mechanism.

FIG. 4B illustrates an example method 425 for using a sponsor in a multi-factor authentication chain of trust from the perspective of an access device. Although the example method 425 depicts a particular sequence of operations, the sequence may be altered without departing from the scope of the present disclosure. For example, some of the operations depicted may be performed in parallel or in a different sequence that does not materially affect the function of the method 425. In other examples, different components of an example device or system that implements the method 425 may perform functions at substantially the same time or in a specific sequence.

In some embodiments, the method includes sending a request for authentication via a sponsor in a multi-factor authentication chain of trust associated with a first user account at step 430. For example, access device 230 in FIG. 2A may send, to trusted authentication provider 160, a request to register sponsor 220 in a multi-factor authentication chain of trust.

In some embodiments, the method includes receiving, from the sponsor, a request for verification of an identity of a first user associated with the first user account at step 435. For example, access device 230 in FIG. 2A may receive a verification request from sponsor device 220 to verify the identity of user 110.

In some embodiments, the method includes sending a verification of the identity of the first user at step 440. For example, access device 230 in FIG. 2A may send verification of the identity of user 110 to sponsor device 220.

In some embodiments, the method includes receiving access to a service for the first user account at step 445. For example, access device in FIG. 2A may receive access to resource 170.

FIG. 4C illustrates an example method 450 for registering a sponsor in a multi-factor authentication chain of trust from the perspective of a sponsor device. Although the example method 450 depicts a particular sequence of operations, the sequence may be altered without departing from the scope of the present disclosure. For example, some of the operations depicted may be performed in parallel or in a different sequence that does not materially affect the function of the method 450. In other examples, different components of an example device or system that implements the method 450 may perform functions at substantially the same time or in a specific sequence.

In some embodiments, the method includes receiving a request for authentication via a sponsor in a multi-factor authentication chain of trust associated with a first user account at step 455. For example, sponsor device 220 in FIG. 2A may receive a request for registration in a multi-factor chain of trust for user 110 from trusted authentication provider 160.

In some embodiments, the method includes sending a request for verification of an identity of a first user associated with the first user account at step 460. For example, sponsor device 220 in FIG. 2A may send a request for verification of the identity of user 110 to access device 230.

In some embodiments, the method includes receiving a verification of an identity of the first user at step 465. For example, sponsor device 220 in FIG. 2A may receive verification of the identity of user 110 from access device 230.

In some embodiments, the method includes forwarding the verification at step 470. For example, sponsor device 220 in FIG. 2A may forward verification of the identity of user 110 to trusted authentication provider 170. Trusted authentication provider 170 can then authenticate user 110 to resource 170.

Figure 5:
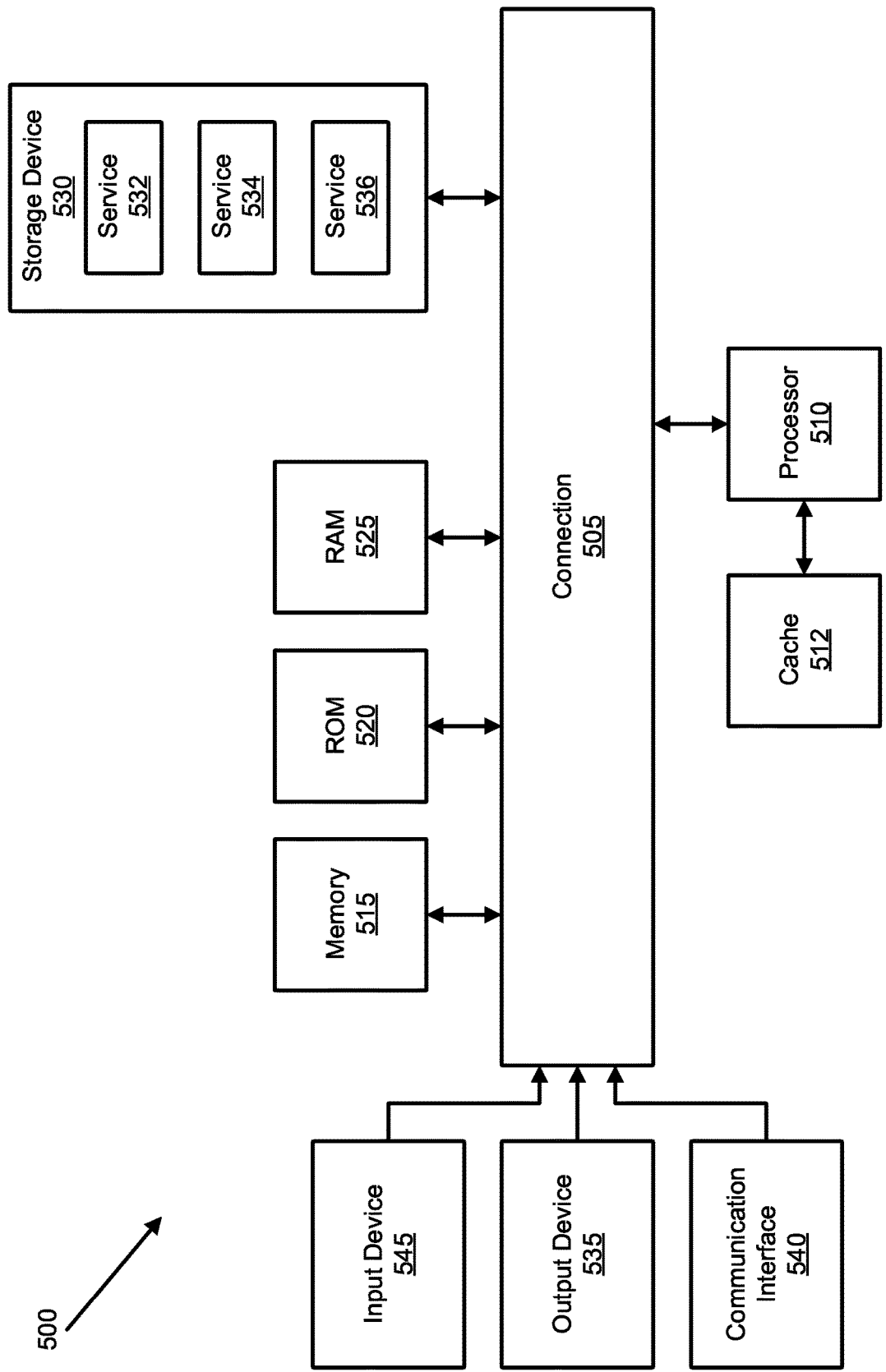
FIG. 5 illustrates an example computing system architecture in accordance with some aspects of the present technology.

FIG. 5 illustrates an example computing device architecture, in accordance with some examples of the present technology. The components of the computing device architecture 500 are shown in electrical communication with each other using a connection 505, such as a bus. The example computing device architecture 500 includes a processing unit (CPU or processor) 510 and a computing device connection 505 that couples various computing device components including the computing device memory 515, such as read only memory (ROM) 520 and random access memory (RAM) 525, to the processor 510.

The computing device architecture 500 can include a cache of high-speed memory connected directly with, in close proximity to, or integrated as part of the processor 510. The computing device architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other computing device memory 515 may be available for use as well. The memory 515 can include multiple different types of memory with different performance characteristics. The processor 510 can include any general purpose processor and a hardware or software service, such as service 532, service 534, and service 536 stored in storage device 530, configured to control the processor 510 as well as a special-purpose processor where software instructions are incorporated into the processor design. The processor 510 may be a self-contained system, containing multiple cores or processors, a bus, memory controller, cache, etc. A multi-core processor may be symmetric or asymmetric.

To enable user interaction with the computing device architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art, such as a display, projector, television, speaker device, etc. In some instances, multimodal computing devices can enable a user to provide multiple types of input to communicate with the computing device architecture 500. The communications interface 540 can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. The storage device 530 can include services 532, 534, 536 for controlling the processor 510. Other hardware or software modules are contemplated. The storage device 530 can be connected to the computing device connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method for using a sponsor as a proxy for multi-factor authentication of a first user account for a first user when a primary multi-factor authentication mechanism is unavailable to the first user account, the method comprising:
   registering the sponsor in a multi-factor authentication chain of trust within a third party authentication provider separate from a service, wherein the multi-factor authentication chain of trust is associated with the first user account;

receiving, from the service and to the third party authentication provider, a request for verification of an identity of an access device associated with the first user account;
requesting, from the third party authentication provider to a sponsor, verification of an identity of the access device;
receiving, from a sponsor device associated with the sponsor to the third party authentication provider, a verification that the access device is associated with the first user account; and
sending, from the third party authentication provider to the service, the verification from the sponsor device to grant access to the access device.

2. The method of claim 1, wherein registering the sponsor in the multi-factor authentication chain of trust includes associating the sponsor with a sponsor policy that defines when use of the sponsor is permitted.

3. The method of claim 1, wherein the granted access is limited by an access policy that defines limited access when access is granted based on the verification of the sponsor.

4. The method of claim 1, wherein the request for verification of the identity from the sponsor includes a declaration that the primary multi-factor authentication mechanism must be replaced.

5. The method of claim 1, wherein granting access to the service includes:
sending a link to onboard a new multi-factor authentication mechanism;
after onboarding the new multi-factor authentication mechanism, removing the primary multi-factor authentication mechanism from the multi-factor authentication chain of trust; and
re-enabling access to the service through the new multi-factor authentication mechanism.

6. The method of claim 1, wherein requesting verification of the identity of the first user from the sponsor comprises:
initiating a communication between the first user account and the sponsor.

7. The method of claim 1, wherein the primary multi-factor authentication mechanism is responsible for generating keys derived from biometric data, and wherein the primary multi-factor authentication mechanism must be replaced comprising:
instructing a replacement primary multi-factor authentication mechanism to generate a new biometrically derived key;
receiving the new biometrically derived key;
storing the new biometrically derived key in association with the service to be used in future authentications.

8. The method of claim 1, comprising:
receiving a request to access a service accompanied by log-in credentials for the first user account.

9. The method of claim 8, comprising:
determining that a multi-factor authentication request failed;
notifying the first user account that the multi-factor authentication request failed.

10. The method of claim 8, comprising:
determining that a trust score associated with the primary multi-factor authentication mechanism is too low to perform the multi-factor authentication.

11. The method of claim 8, comprising:
receiving a request to have the sponsor satisfy the multi-factor authentication for the first user account.

12. A system for using a sponsor as a proxy for multi-factor authentication of a first user account for a first user when a primary multi-factor authentication mechanism is unavailable to the first user account, the system comprising:
one or more processors; and
at least one non-transitory computer-readable medium having stored therein instructions which, when executed by the one or more processors, cause the one or more processors to perform operations comprising:
registering the sponsor in a multi-factor authentication chain of trust within a third party authentication provider separate from a service, wherein the multi-factor authentication chain of trust is associated with the first user account;
receiving, from the service and to the third party authentication provider, a request for verification of an identity of an access device associated with the first user account;
requesting, from the third party authentication provider to a sponsor, verification of an identity of the access device;
receiving, from a sponsor device associated with the sponsor to the third party authentication provider, a verification that the access device is associated with the first user account; and
sending, from the third party authentication provider to the service, the verification from the sponsor device to grant access to the access device.

13. The system of claim 12, wherein registering the sponsor in the multi-factor authentication chain of trust includes associating the sponsor with a sponsor policy that defines when use of the sponsor is permitted.

14. The system of claim 12, wherein the granted access is limited by an access policy that defines limited access when access is granted based on the verification of the sponsor.

15. The system of claim 12, wherein the request for verification of the identity from the sponsor includes a declaration that the primary multi-factor authentication mechanism must be replaced.

16. The system of claim 12, the instructions further causing the one or more processors to perform operations comprising:
receiving a request to access a service accompanied by log-in credentials for the first user account;
determining that a multi-factor authentication request failed;
notifying the first user account that the multi-factor authentication request failed;
determining that a trust score associated with the primary multi-factor authentication mechanism is too low to perform the multi-factor authentication; and
receiving a request to have the sponsor satisfy the multi-factor authentication for the first user account.

17. A non-transitory computer-readable medium having stored therein instructions for using a sponsor as a proxy for multi-factor authentication of a first user account for a first user when a primary multi-factor authentication mechanism is unavailable to the first user account which, when executed by a processor, cause the processor to perform operations comprising:
registering the sponsor in a multi-factor authentication chain of trust within a third party authentication provider separate from a service, wherein the multi-factor authentication chain of trust is associated with the first user account;
receiving, from the service and to the third party authentication provider, a request for verification of an identity of an access device associated with the first user account;

requesting, from the third party authentication provider to a sponsor, verification of an identity of the access device;

receiving, from a sponsor device associated with the sponsor to the third party authentication provider, a verification that the access device is associated with the first user account; and sending, from the third party authentication provider to the service, the verification from the sponsor device to grant access to the access device.

18. The non-transitory computer-readable medium of claim 17, wherein registering the sponsor in the multi-factor authentication chain of trust includes associating the sponsor with a sponsor policy that defines when use of the sponsor is permitted.

19. The non-transitory computer-readable medium of claim 17, wherein the granted access is limited by an access policy that defines limited access when access is granted based on the verification of the sponsor.

20. The non-transitory computer-readable medium of claim 17, wherein the request for verification of the identity from the sponsor includes a declaration that the primary multi-factor authentication mechanism must be replaced.

* * * * *